United States Patent
Xiao et al.

(10) Patent No.: US 8,249,557 B2
(45) Date of Patent: Aug. 21, 2012

(54) MOBILE PHONE

(75) Inventors: Yun-Shan Xiao, Shenzhen (CN); Hai-Qing Zhou, Shenzhen (CN); Song-Lin Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 122 days.

(21) Appl. No.: 12/871,942

(22) Filed: Aug. 31, 2010

(65) Prior Publication Data
US 2012/0034901 A1 Feb. 9, 2012

(30) Foreign Application Priority Data

Aug. 4, 2010 (CN) .......................... 2010 1 0245053

(51) Int. Cl.
*H04M 1/66* (2006.01)
*H04K 1/00* (2006.01)
*G06K 9/62* (2006.01)
*G06F 21/00* (2006.01)
*H04B 1/00* (2006.01)

(52) U.S. Cl. ......... 455/411; 380/247; 380/248; 380/249; 380/250; 382/124; 382/115; 713/186; 340/5.52

(58) Field of Classification Search ................... 455/411
See application file for complete search history.

(56) References Cited

U.S. PATENT DOCUMENTS

| 2002/0095608 A1* | 7/2002 | Slevin | ............................ 713/202 |
| 2003/0095690 A1* | 5/2003 | Su et al. | ........................ 382/124 |

* cited by examiner

*Primary Examiner* — Wayne Cai
*Assistant Examiner* — Timothy Pham
(74) *Attorney, Agent, or Firm* — Altis Law Group, Inc.

(57) ABSTRACT

A mobile phone includes a fingerprint input unit, a storage unit, a switch unit, and a control unit. The fingerprint input unit is used to read and record fingerprint information of a user, and output the fingerprint information. The storage unit stores a fingerprint mode. The switch unit is connected to a power on/off terminal of the mobile phone. The control unit is used to receive the fingerprint information and compare the received fingerprint information with the stored fingerprint mode. If the received fingerprint information is not consistent with the stored fingerprint mode and the mobile phone is at a power-off state, the control unit outputs a first control signal to control switch unit to keep the mobile phone being at the power-off state.

18 Claims, 3 Drawing Sheets

US 8,249,557 B2

MOBILE PHONE

BACKGROUND

1. Technical Field

The present disclosure relates to mobile phones, and particularly to a mobile phone with fingerprint identifying function.

2. Description of Related Art

Recently, mobile phones have spread at a remarkable pace and have developed as portable information processing units having multiple functions such as text messaging, e-mail, and for storing of personal information. However unauthorized access of personal information stored in mobile phones poses a problem. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
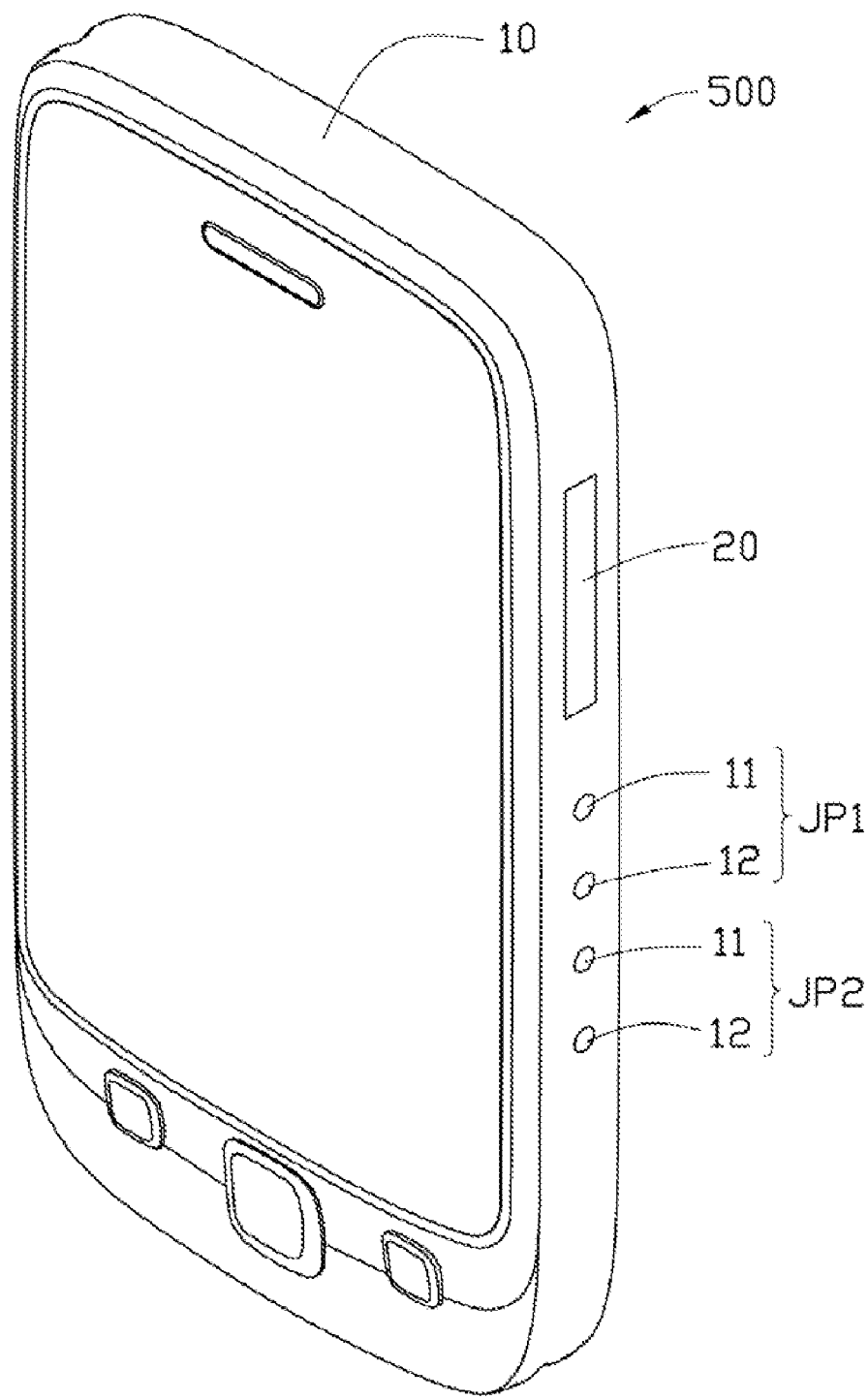
FIG. 1 is a schematic, isometric view of an exemplary embodiment of a mobile phone.
Figure 2:
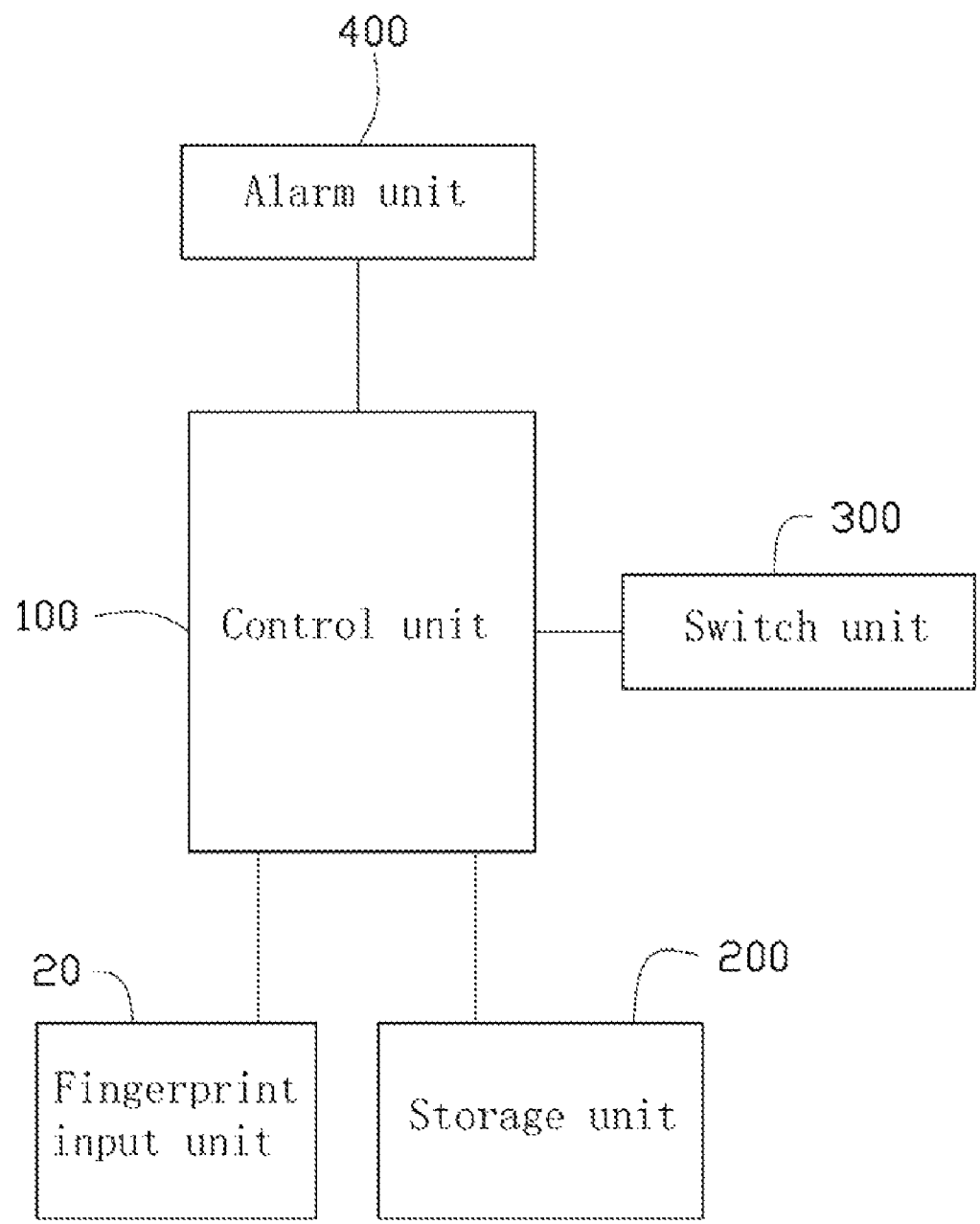
FIG. 2 is a block diagram of the mobile phone of FIG. 1.

Referring to FIGS. 1 and 2, an exemplary embodiment of a mobile phone 500 includes a housing 10, a fingerprint input unit 20 arranged on the housing 10, and a control unit 100, a storage unit 200, a switch unit 300, and an alarm unit 400 arranged in the housing 10. The fingerprint input unit 20, the storage unit 200, the switch unit 300, and the alarm unit 400 are all connected to the control unit 100.

Figure 3:
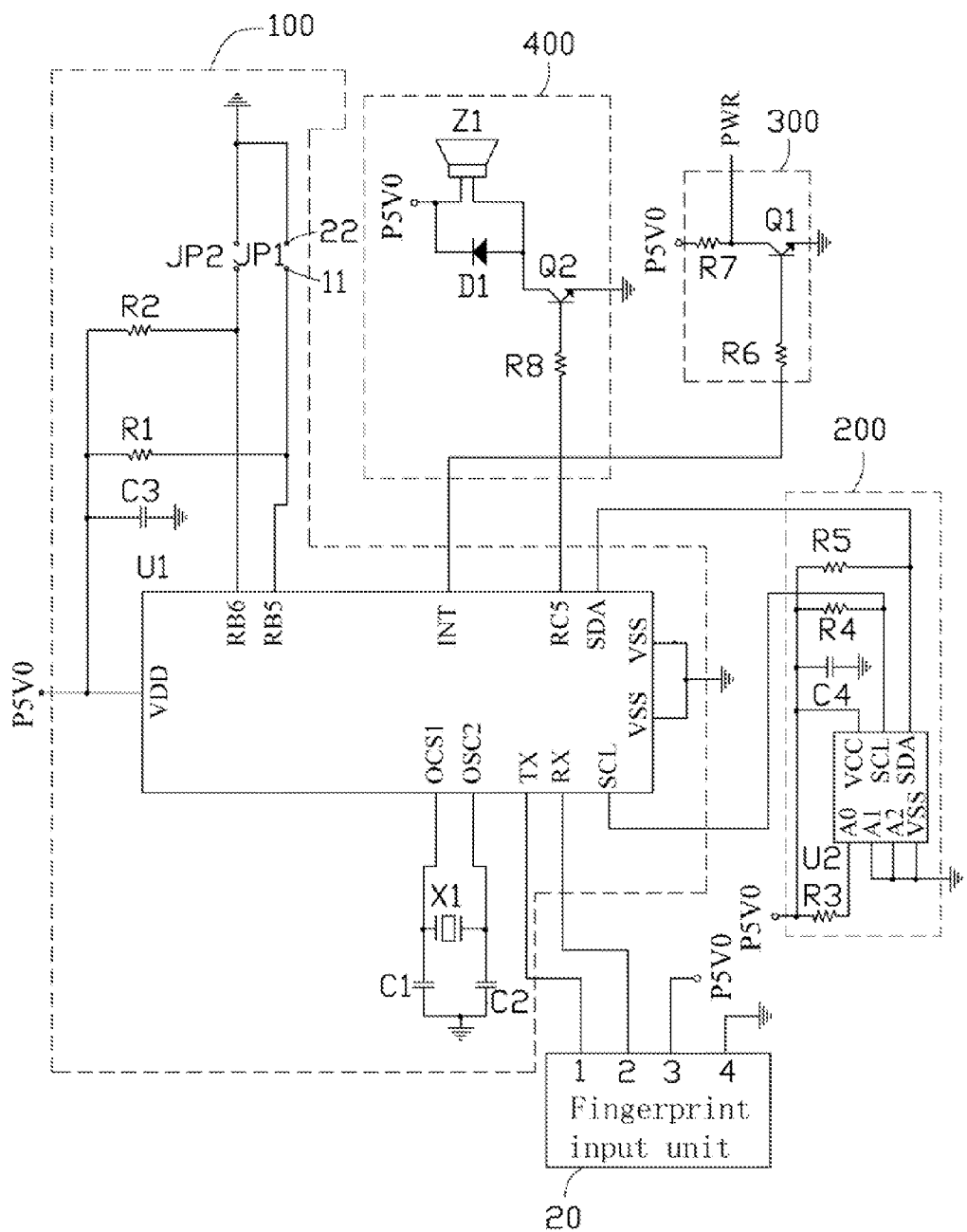
FIG. 3 is a circuit diagram of the mobile phone of FIG. 2.

Referring to FIG. 3, the fingerprint input unit 20 is used to sense a fingerprint of a user of the mobile phone 500, read and record fingerprint information of the user and output the fingerprint information to the control unit 100. The fingerprint input unit 20 includes a receiving terminal 1, a transmitting terminal 2, a voltage terminal 3, and a ground terminal 4. The voltage terminal 3 is connected to a power source P5V0. The ground terminal 4 is grounded.

The control unit 100 includes a microcontroller U1, a crystal oscillator X1, first and second jumper pins JP1 and JP2 arranged on one side surface of the mobile phone 500, resistors R1 and R2, and capacitors C1-C3. Each jumper pin includes two pins 11 and 22. A first clock pin OCS1 of the microcontroller U1 is grounded by the capacitor C1. A second clock pin OSC2 of the microcontroller U1 is grounded by the capacitor C2. The crystal oscillator X1 is connected between the first and second clock pins OCS1 and OSC2 of the microcontroller U1. A transmitting pin TX of the microcontroller U1 is connected to the receiving terminal 1 of the fingerprint input unit 20. A receiving pin RX of the microcontroller U1 is connected to the transmitting terminal 2 of the fingerprint input unit 20. An input and output (I/O) pin RB5 of the microcontroller U1 is connected to the pin 11 of the first jumper pin JP1, and connected to a voltage pin VDD of the microcontroller U1 by the resistor R1. The pin 22 of the first jumper pin JP1 is grounded. The voltage pin VDD of the microcontroller U1 is connected to the power source P5V0. An I/O pin RB6 of the microcontroller U1 is connected to the pin 11 of the second jumper pin JP2. The pin 22 of the second jumper pin JP2 is grounded. Two ground pins VSS of the microcontroller U1 are grounded. The capacitor C3 is connected between the voltage pin VDD of the microcontroller U1 and ground.

The storage unit 200 includes a storage chip U2, resistors R3-R5, and a capacitor C4. An address terminal A0 of the storage chip U2 is connected to the power source P5V0 by the resistor R3. A voltage terminal VCC of the storage chip U2 is connected to the power source P5V0 and is also grounded through the capacitor C4. A clock terminal SCL of the storage chip U2 is connected to the voltage terminal VCC of the storage chip U2 by the resistor R4, and is also connected to a clock pin SCL of the microcontroller U1. A data terminal SDA of the storage chip U2 is connected to the voltage terminal VCC of the storage chip U2 by the resistor R5, and is also connected to a data pin SDA of the microcontroller U1. A ground terminal VSS of the storage chip U2 is grounded. Two address terminals A1 and A2 of the storage chip U2 are grounded. In one embodiment, the storage chip U2 may be an electrically erasable programmable read only memory (EEPROM). In other embodiments, the storage chip U2 can be other types of storage chips.

The switch unit 300 includes a transistor Q1 and two resistors R6 and R7. A base of the transistor Q1 is connected to an interrupt pin INT of the microcontroller U1 by the resistor R6. An emitter of the transistor Q1 is grounded. A collector of the transistor Q1 is connected to the power source P5V0 by the resistor R7, and is also connected to a power on/off terminal PWR of the mobile phone 500. In one embodiment, the transistor Q1 functioning as an electronic switch is an NPN transistor. In other embodiments, the transistor Q1 can be other types of electronic switches, such as an n-channel metal oxide semiconductor field effect transistor (NMOSFET).

The alarm unit 400 includes a transistor Q2, a diode D2, a buzzer Z1, and a resistor R8. A base of the transistor Q2 is connected to an output pin RC5 of the microcontroller U1 by the resistor R8. An emitter of the transistor Q2 is grounded. A collector of the transistor Q2 is connected to an anode of the diode D2. A cathode of the diode D2 is connected to the power source P5V0. The buzzer Z1 is connected between the anode and the cathode of the diode D2. In one embodiment, the transistor Q2 functioning as an electronic switch is an NPN transistor. In other embodiments, the transistor Q2 can be other types of electronic switches, such as an NMOSFET.

When the power on/off terminal PWR of the mobile phone 500 receives a low level voltage (e.g., 0V), a current state of the mobile phone 500 will be changed, the microcontroller U1 records the changed state. For example, when the current state of the mobile phone 500 is at a powered-off state and the power on/off terminal PWR of the mobile phone 500 receives the low level voltage, the mobile phone 500 will be turned on. The microcontroller U1 records that the mobile phone 500 is at the power-on state. When the power on/off terminal PWR of the mobile phone 500 receives a high level voltage (e.g., 3V), the current state of the mobile phone 500 will be kept being at the power-off state.

When a jumper (not shown) is selectively connected to one of the first and second jumper pins JP1, JP2, the I/O pin RB5 or RB6 of the microcontroller U1 receives a low level voltage (e.g. 0 volts), the fingerprint input unit 20 records fingerprint information of a first user or a second user. When two jumpers are connected to the first and second jumper pins JP1, JP2, the I/O pins RB5 and RB6 of the microcontroller U1 receive the low level voltage, the control unit 100 storages the received fingerprint information in the storage unit 200. When two jumpers are disconnected from the first and second jumper pins JP1, JP2, the I/O pins RB5 and RB6 of the microcontroller U1 receive a high level voltage (e.g. 3 volts); the fingerprint input unit 20 is forbidden from reading and recording fingerprint information of any user.

The following depicts a work process of the mobile phone 500 with the fingerprint identifying function. Before the mobile phone 500 is used, the mobile phone 500 is at the power-on state. A first jumper is selectively connected to one of the first and second jumper pins JP1, JP2, the fingerprint input unit 20 records fingerprint information of the first user or the second user and outputs the fingerprint information to the microcontroller U1. A second jumper is connected to the other one of the first and second jumper pins JP1, JP2, the microcontroller U1 generates a fingerprint model according to the received fingerprint information, and stores the fingerprint model in the storage unit 200. In other embodiments, the number of the jumper pins can be changed according to need to record and storage options of users.

When the microcontroller U1 records that the mobile phone 500 is at the power-off state, the user touches the fingerprint input unit 20, and the fingerprint input unit 20 reads and records the fingerprint information of the user and sends the fingerprint information to the microcontroller U1. The microcontroller U1 receives the fingerprint information and compares the received fingerprint information with the fingerprint model stored in the storage chip U2. If the received fingerprint information is consistent with the fingerprint model, the output pin INT of the microcontroller U1 outputs the high level voltage, such as 3 volts (V), the transistor Q1 is turned on, the collector of the transistor Q1 outputs the low level voltage, such as 0V, to the power on/off terminal PWR of the mobile phone 500. The mobile phone is turned on. The microcontroller U1 records that the mobile phone 500 is at the power-on state. If the received fingerprint information is not consistent with the fingerprint model, the output pin INT of the microcontroller U1 outputs the low level voltage, the transistor Q1 is turned off, the collector of the transistor Q1 outputs the high level voltage to the power on/off terminal PWR of the mobile phone 500, the current state of the mobile phone 500 is not changed. The mobile phone 500 is still at the power-off state.

When the microcontroller U1 records that the mobile phone 500 is at the power-on state, the user touches the fingerprint input unit 20, and the fingerprint input unit 20 reads the fingerprint information of the user and sends the fingerprint information to the microcontroller U1. The microcontroller U1 receives the fingerprint information and compares the received fingerprint information with the fingerprint model stored in the storage chip U2. If the received fingerprint information is consistent with the fingerprint model, the microcontroller U1 starts the buzzer Z to remind whether the mobile phone 500 needs to be turned off, if the buzzer Z buzzes a predetermined number of times, such as, three times, the microcontroller U1 does not receive the fingerprint information again, the output pin INT of the microcontroller U1 outputs the low level voltage, the transistor Q1 is turned off, the collector of the transistor Q1 outputs the high level voltage to the power on/off terminal PWR of the mobile phone 500. The current state of the mobile phone is not changed. The mobile phone is still at the power-on state. If the buzzer Z buzzes for the predetermined number of times, the microcontroller U1 still receives the fingerprint information, the output pin INT of the microcontroller U1 outputs the high level voltage, the transistor Q1 is turned on, the collector of the transistor Q1 outputs the low level voltage to the power on/off terminal PWR of the mobile phone 500. The mobile phone is powered off. The microcontroller U1 records that the mobile phone is at the power-off state. If the received fingerprint information is not consistent with the fingerprint model, the microcontroller U1 turns off the mobile phone 500.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A mobile phone comprising:
a power on/off terminal;
a fingerprint input unit to read and record fingerprint information of a user, and output the fingerprint information;
a storage unit storing a fingerprint mode;
a switch unit connected to the power on/off terminal;
a control unit to receive the fingerprint information and compare the received fingerprint information with the stored fingerprint mode, wherein upon a condition that the received fingerprint information is not consistent with the stored fingerprint mode and the mobile phone is at a power-off state, the control unit outputs a first control signal to control the switch unit to keep the mobile phone being at the power-off state; and
an alarm unit connected to the control unit;
wherein upon a condition that the received fingerprint information is consistent with the stored fingerprint mode and the mobile phone is at a power-on state, the control unit starts the alarm unit predetermined times to remind whether the mobile phone needs to be turned off; upon a condition that the control unit does not receive the fingerprint information again after the alarm unit is started the predetermined times, the control unit outputs the first control signal to the switch unit to keep the mobile phone being at the power-on state; upon a condition that the control unit still receives the fingerprint information after the alarm unit is started the predetermined times, the control unit outputs a second control signal to the switch unit to turn off the mobile phone, and the control unit records that the mobile phone is at the power-off state.

2. The mobile phone of claim 1, wherein upon a condition that the received fingerprint information is not consistent with the stored fingerprint mode and the mobile phone is at a power-on state, the control unit outputs the second control signal to the switch unit to turn off the mobile phone, the control unit records that the mobile phone is at the power-off state.

3. The mobile phone of claim 1, wherein upon a condition that the received fingerprint information is consistent with the stored fingerprint mode and the mobile phone is at a power-off state, the control unit outputs the first control signal to the switch unit to turn on the mobile phone, the control unit records that the mobile phone is at the power-on state.

4. The mobile phone of claim 1, wherein the alarm unit comprises a transistor, a diode, and a buzzer, a base of the transistor is connected to the control unit to receive the first and second control signals, an emitter of the transistor is grounded, a collector of the transistor is connected to an anode of the diode, a cathode of the diode is connected to a power source, the buzzer is connected between the anode and the cathode of the diode.

5. The mobile phone of claim 1, wherein the control unit comprises a microcontroller, first and second jumper pins, a first resistor, and a second resistor, each jumper pin comprises first and second pins, a first input and output (I/O) pin of the microcontroller is connected to the first pin of the first jumper pin, the second pin of the first jumper pin is grounded, a second I/O pin of the microcontroller is connected to the first pin of the second jumper pin, the second pin of the second jumper pin is grounded, the first resistor is connected between the first I/O pin of the microcontroller and a power source, the second resistor is connected between the second I/O pin of the microcontroller and the power source, when a jumper is connected to the first or second jumper pin, the fingerprint information of the user is read and recorded by the fingerprint input unit.

6. The mobile phone of claim 5, wherein the storage unit comprises a storage chip, an address terminal and a voltage terminal of the storage chip are connected to the power source, a clock terminal of the storage chip is connected to the voltage terminal of the storage chip and a clock pin of the microcontroller, a data terminal of the storage chip is connected to the voltage terminal of the storage chip and a data pin of the microcontroller, a ground terminal of the storage chip is grounded.

7. The mobile phone of claim 6, wherein the storage unit further comprises a first capacitor and third to fifth resistors, the first capacitor is connected between the voltage terminal of the storage chip and ground, the third resistor is connected between the address terminal of the storage chip and the power source, the fourth resistor is connected between the clock terminal and the voltage terminal of the storage chip, the fifth resistor is connected between the data terminal and the voltage terminal of the storage chip, and connected to a data pin of the microcontroller.

8. The mobile phone of claim 6, wherein the switch unit comprises a second transistor and a six resistor, a base of the second transistor is connected to an interrupt pin of the microcontroller, an emitter of the transistor is grounded, a collector of the transistor is connected to the power source by the six resistor and is also connected to the power on/off terminal.

9. A mobile phone comprising:
a fingerprint reader;
a storage unit storing a plurality of fingerprints;
a power on/off terminal;
a switch unit connected to the power on/off terminal;
a control unit receiving a user swiped fingerprint on the fingerprint reader and comparing the swiped fingerprint with the plurality of stored fingerprints in the storage unit, wherein upon a condition that the swiped fingerprint is not consistent with any of the stored fingerprints, the mobile phone remains in its present power-on or power-off state, wherein upon a condition that the swiped fingerprint is consistent with one of the stored fingerprints, the switch unit controls the power on/off terminal to power on the mobile phone if the mobile phone was in the power-off state; and
an alarm unit connected to the control unit;
wherein upon a condition that the received fingerprint information is consistent with the stored fingerprint mode and the mobile phone is at a power-on state, the control unit starts the alarm unit predetermined times to remind whether the mobile phone needs to be turned off; upon a condition that the control unit does not receive the fingerprint information again after the alarm unit is started the predetermined times, the control unit outputs the first control signal to the switch unit to keep the mobile phone being at the power-on state; upon a condition that the control unit still receives the fingerprint information after the alarm unit is started the predetermined times, the control unit outputs a second control signal to the switch unit to turn off the mobile phone, and the control unit records that the mobile phone is at the power-off state.

10. The mobile phone of claim 9, wherein the alarm unit comprises a transistor, a diode, and a buzzer, a base of the transistor is connected to the control unit to receive the first and second control signals, an emitter of the transistor is grounded, a collector of the transistor is connected to an anode of the diode, a cathode of the diode is connected to a power source, the buzzer is connected between the anode and the cathode of the diode.

11. The mobile phone of claim 9, wherein the control unit comprises a microcontroller, first and second jumper pins, a first resistor, and a second resistor, each jumper pin comprises first and second pins, a first input and output (I/O) pin of the microcontroller is connected to the first pin of the first jumper pin, the second pin of the first jumper pin is grounded, a second I/O pin of the microcontroller is connected to the first pin of the second jumper pin, the second pin of the second jumper pin is grounded, the first resistor is connected between the first I/O pin of the microcontroller and a power source, the second resistor is connected between the second I/O pin of the microcontroller and the power source, when a jumper is connected to the first or second jumper pin, the swiped fingerprint is read and recorded by the fingerprint reader.

12. The mobile phone of claim 11, wherein the storage unit comprises a storage chip, an address terminal and a voltage terminal of the storage chip are connected to the power source, a clock terminal of the storage chip is connected to the voltage terminal of the storage chip and a clock pin of the microcontroller, a data terminal of the storage chip is connected to the voltage terminal of the storage chip and a data pin of the microcontroller, a ground terminal of the storage chip is grounded.

13. The mobile phone of claim 12, wherein the storage unit further comprises a first capacitor and third to fifth resistors, the first capacitor is connected between the voltage terminal of the storage chip and ground, the third resistor is connected between the address terminal of the storage chip and the power source, the fourth resistor is connected between the clock terminal and the voltage terminal of the storage chip, the fifth resistor is connected between the data terminal and the voltage terminal of the storage chip, and connected to a data pin of the microcontroller.

14. The mobile phone of claim 12, wherein the switch unit comprises a second transistor and a six resistor, a base of the second transistor is connected to an interrupt pin of the microcontroller, an emitter of the transistor is grounded, a collector of the transistor is connected to the power source by the six resistor and is also connected to the power on/off terminal.

15. A mobile phone comprising:
a power on/off terminal;
a fingerprint input unit to read and record fingerprint information of a user, and output the fingerprint information;
a storage unit storing a fingerprint mode;
a switch unit connected to the power on/off terminal; and
a control unit to receive the fingerprint information and compare the received fingerprint information with the stored fingerprint mode, wherein upon a condition that the received fingerprint information is not consistent with the stored fingerprint mode and the mobile phone is at a power-off state, the control unit outputs a first control signal to control the switch unit to keep the mobile phone being at the power-off state;

wherein the control unit comprises a microcontroller, first and second jumper pins, a first resistor, and a second resistor, each jumper pin comprises first and second pins, a first input and output (I/O) pin of the microcontroller is connected to the first pin of the first jumper pin, the second pin of the first jumper pin is grounded, a second I/O pin of the microcontroller is connected to the first pin of the second jumper pin, the second pin of the second jumper pin is grounded, the first resistor is connected between the first I/O pin of the microcontroller and a power source, the second resistor is connected between the second I/O pin of the microcontroller and the power source, and when a jumper is connected to the first or second jumper pin, the fingerprint information of the user is read and recorded by the fingerprint input unit.

16. The mobile phone of claim 15, wherein the storage unit comprises a storage chip, an address terminal and a voltage terminal of the storage chip are connected to the power source, a clock terminal of the storage chip is connected to the voltage terminal of the storage chip and a clock pin of the microcontroller, a data terminal of the storage chip is connected to the voltage terminal of the storage chip and a data pin of the microcontroller, a ground terminal of the storage chip is grounded.

17. The mobile phone of claim 16, wherein the storage unit further comprises a first capacitor and third to fifth resistors, the first capacitor is connected between the voltage terminal of the storage chip and ground, the third resistor is connected between the address terminal of the storage chip and the power source, the fourth resistor is connected between the clock terminal and the voltage terminal of the storage chip, and the fifth resistor is connected between the data terminal and the voltage terminal of the storage chip, and connected to a data pin of the microcontroller.

18. The mobile phone of claim 16, wherein the switch unit comprises a second transistor and a six resistor, a base of the second transistor is connected to an interrupt pin of the microcontroller, an emitter of the transistor is grounded, and a collector of the transistor is connected to the power source by the six resistor and is also connected to the power on/off terminal.

* * * * *